United States Patent
Pugh et al.

(10) Patent No.: US 9,457,848 B2
(45) Date of Patent: Oct. 4, 2016

(54) UTILITY VEHICLE WITH ADJUSTABLE WHEEL BASE AND WHEEL STANCE

(71) Applicant: GREEN INDUSTRY INNOVATORS, L.L.C., Louisville, OH (US)

(72) Inventors: Todd Pugh, Louisville, OH (US); Steffon Hoppel, Louisville, OH (US)

(73) Assignee: Green Industry Innovators, L.L.C., Louisville, OH (US)

( * ) Notice: Subject to any disclaimer, the term of this patent is extended or adjusted under 35 U.S.C. 154(b) by 43 days.

(21) Appl. No.: 14/224,801

(22) Filed: Mar. 25, 2014

(65) Prior Publication Data
US 2015/0274225 A1    Oct. 1, 2015

(51) Int. Cl.
| B62D 49/08 | (2006.01) |
| B62D 49/06 | (2006.01) |
| B62D 49/04 | (2006.01) |

(52) U.S. Cl.
CPC ........... B62D 49/0678 (2013.01); B62D 49/04 (2013.01); B62D 49/0614 (2013.01)

(58) Field of Classification Search
CPC .............. B62D 49/0678; B62D 49/08; B60G 2300/40
USPC ................................ 180/209; 280/6.156, 638
See application file for complete search history.

(56) References Cited

U.S. PATENT DOCUMENTS

| 1,967,283 A * | 7/1934 | Brown ........................... 180/209 |
| 2,559,935 A | 7/1951 | Brown |
| 3,014,734 A | 12/1961 | Swenson |
| 3,306,390 A | 2/1967 | Jamme |
| 3,411,804 A * | 11/1968 | Hill ........................... B62D 7/02 280/124.113 |
| 3,531,137 A | 9/1970 | Ganz et al. |
| 4,265,326 A * | 5/1981 | Lauber ...................... B60F 5/00 180/8.3 |
| 4,363,374 A * | 12/1982 | Richter .............. B62D 49/0607 172/273 |
| 4,834,409 A | 5/1989 | Kramer |
| 6,213,218 B1 | 4/2001 | Miller |
| 7,252,169 B2 | 8/2007 | McLean et al. |
| 7,832,741 B2 | 11/2010 | Donaldson |
| 8,887,841 B2 | 11/2014 | Oswald et al. |
| 8,888,122 B2 * | 11/2014 | Berry ...................... B66C 23/62 180/212 |

* cited by examiner

Primary Examiner — Bryan Evans
(74) Attorney, Agent, or Firm — Sand & Sebolt

(57) ABSTRACT

A utility vehicle with wheel assemblies that are adjustable to accommodate different weight attachments that are selectively engaged with the vehicle. The vehicle has a frame with a pair of rear wheels and a pair of front wheel assemblies spaced a first distance longitudinally from the rear wheels and a second distance laterally from each other. One or both of the front wheel assemblies are selectively adjustable so as to vary one or both of the first distance and the second distance. This adjustment is made to change the balance between the weight of an overhung load due to different weight attachments and the weight of the rest of the vehicle with the operator. The adjustment of one or both of the right and left front wheel assemblies simultaneously adjusts the first and second distances while maintaining the operational height of the vehicle's frame relative to the ground.

30 Claims, 14 Drawing Sheets

(1)

UTILITY VEHICLE WITH ADJUSTABLE WHEEL BASE AND WHEEL STANCE

BACKGROUND OF THE INVENTION

1. Technical Field

This invention relates generally to powered vehicles. More particularly this invention relates to a utility vehicle which is used for a variety of purposes by securing a range of different attachments to the vehicle. Specifically, this invention is directed to a utility vehicle which has adjustable front wheel assemblies that enable a user to change the wheel base (distance between the front and rear wheels) and the wheel stance (distance between the left wheels and the right wheels) so as to strike a balance of the overhung load, i.e., the load due to the weight of the attachment engaged with the vehicle, versus the weight of the rest of the vehicle and the operator relative to the performance of the attachment being engaged therewith.

2. Background Information

Mowers and other vehicles frequently have to be driven over uneven or sloped terrain. This makes it particularly important that the mower or vehicle be as balanced and stable as possible when traveling over such terrain. The balance and stability of the vehicle is important as it affects the performance of the vehicle and of any attachments engaged therewith.

Landscapers may utilize vehicles which allow one or more attachments to be engaged with a front end, a rear end, or a side of the vehicle. Such attachments could include mower assemblies, mulching assemblies, edgers, and even snowplow blades or snow blowers. These attachments seldom are of similar weights. Thus, depending on the particular attachment engaged with the vehicle and the location of that attachment, i.e., side or front of the vehicle, the overhung load on the vehicle will differ.

There is therefore a need in the art for an improved utility vehicle which enables a wide range of different attachments of different weights to be engaged therewith without increasing the tendency of the vehicle to become unstable and thereby decreasing the performance of the vehicle and/or the attachment.

SUMMARY

A utility vehicle including adjustable wheels assemblies is disclosed. In one aspect, the invention may provide a utility vehicle have a frame with a front end and a rear end and which is adapted to engage at least two attachments thereon which are of different weights;
  a right and left rear wheel mounted proximate the rear end of the frame; and
  a right and left front wheel assembly mounted proximate the front end of the frame; said front wheel assemblies each including a front wheel; and wherein the front wheels are spaced a first distance from each other and a second distance from the rear wheels; and wherein one or both of the front wheel assemblies are selectively adjustable so as to vary one or both of the first distance and the second distance in order to balance the overhung load (i.e., the attachment) versus the rest of the vehicle plus the operator (the ballast for the overhung load) relative to the performance of the attachment.

The first distance between the left and right front wheels is referred to herein as the wheel stance. The second distance between the front wheels and the rear wheels is referred to herein as the wheel base.

The ability to adjust the wheel stance and/or the wheel base may affect the vehicle's agility and the traction of the drive wheels. Furthermore, being able to move an engagement point of an attachment toward the vehicle's body also tends to shorten the wheel base and widen the wheel stance. This is particularly important when attachments are engaged so as to extend outwardly from the side of the utility vehicle. A side load may cause a shearing effect on the traction of the drive wheels. The further out an attachment is located relative to the body of the vehicle, the less side load it may take to break traction at the drive wheels. The ability in the utility vehicle in accordance with an aspect of the present invention to shorten the wheel base and widen the wheel stance tends to increase traction at the drive wheels and thereby tends to enhance the agility and performance of the vehicle. The more stable the vehicle, the better contact the attachment will have with the terrain over which the vehicle travels and thus the more effective the attachment will be.

In another aspect of the invention the selective adjustment of one or both of the right and left front wheel assemblies simultaneously adjusts the first and second distances. Still further, the rear wheels and front wheels are adapted to contact a ground surface and retain the frame at an operational height relative to the ground surface prior to the selective adjustment of one or both of the right and left front wheel assemblies; and wherein the operational height of the frame remains substantially the same after selective adjustment of one or both of the right and left front wheel assemblies. The right and left front wheel assemblies are independently adjustable.

In another aspect, the invention may provide a system including:
  at least two attachments; each attachment being adapted to perform a different function, and wherein a first one of the attachments is of a different weight to a second one of the attachments; and
  a utility vehicle comprising:
  a frame having a front end and a rear end and wherein one of the first and second attachments is selectively engageable with the frame;
  a left and a right rear wheel mounted proximate the rear end of the frame; and
  a left and a right front wheel assembly mounted proximate the front end of the frame; said front wheel assemblies each including a front wheel; and wherein the front wheels are spaced a first distance from each other and a second distance from the rear wheels; and wherein one or both of the front wheel assemblies are selectively adjustable so as to vary one or both of the first distance and the second distance in accordance with the weight of the engaged one of the first and second attachments.

In accordance with another aspect, the invention may provide a system in which the rear wheels and front wheels are adapted to contact a ground surface and retain the frame at an operational height relative to that ground surface; and wherein the selective adjustment of one or both of the front wheel assemblies does not result in a change in the operational height of the vehicle frame relative to the ground surface. The right and left front wheel assemblies are independently adjustable and the first and second distances are varied simultaneously when either of the front and left wheel assemblies is adjusted.

In another aspect, the invention may provide a method of changing a utility vehicle's weight ratio, i.e., ratio of the weight of the attachment relative to the weight of the rest of the vehicle plus the operator. The vehicle's weight ratio is changed when different weight attachments are engaged with the vehicle. The utility vehicle includes a pair of laterally spaced apart first wheel assemblies and a pair of laterally spaced apart second wheels, where the second wheels are spaced longitudinally from the first wheel assemblies. The method of changing the vehicle's weight ratio includes:

adjusting one or both of the first wheel assemblies so that the first wheel assemblies simultaneously move both laterally and longitudinally relative to the second wheels.

The step of adjusting the first wheel assemblies does not raise the operational height of the utility vehicle's frame relative to a ground surface upon which the first wheel assemblies and the second wheels rest. Furthermore, the wheel assemblies may be adjusted independently of each other.

The step of adjusting one or both of the first wheel assemblies comprises:

lifting the weight of the vehicle off the first wheel assemblies;

disengaging a locking member holding a first one of the first wheel assemblies in a first orientation relative to the vehicle's frame;

moving the first one of the first wheel assemblies to a second orientation relative to the vehicle's frame; and engaging the locking member to hold the first wheel in the second orientation.

BRIEF DESCRIPTION OF THE SEVERAL VIEWS OF THE DRAWINGS

A sample embodiment of the invention, illustrative of the best mode in which Applicant contemplates applying the principles, is set forth in the following description, is shown in the drawings and is particularly and distinctly pointed out and set forth in the appended claims.

Similar numbers refer to similar parts throughout the drawings.

DETAILED DESCRIPTION

Figure 1:
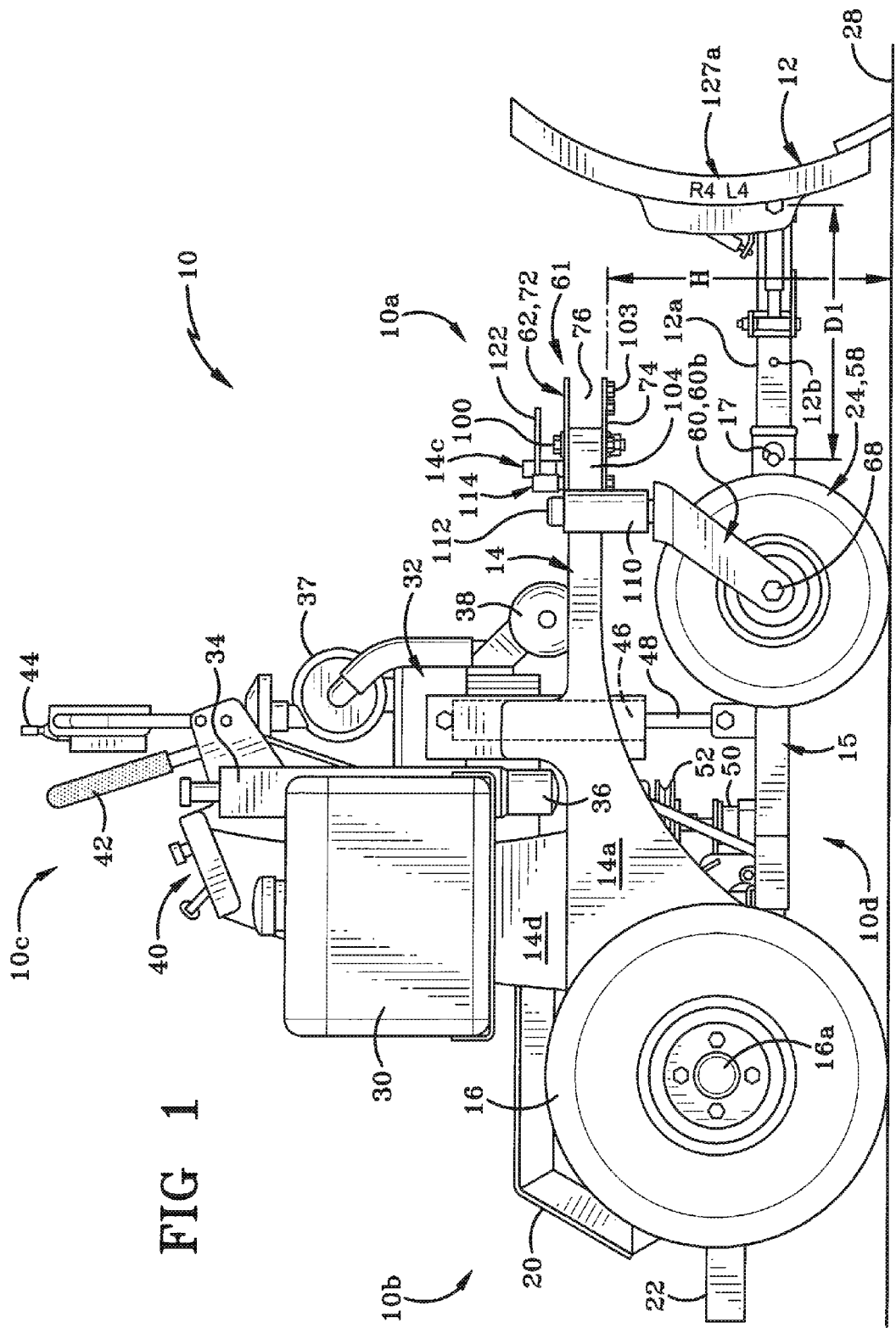
FIG. 1 is a right side view of a utility vehicle in accordance with an aspect of the invention, which vehicle is illustrated with a snowplow blade attachment engaged therewith.

Referring to FIG. 1 there is shown a utility vehicle in accordance with an aspect of the present invention, generally indicated at 10. The utility vehicle preferably is a zero-turn, stand-on unit (i.e., the operator stands on a platform instead of sitting on a seat); and, more specifically, the vehicle is a zero-turn, stand-on mower. It will be understood, however, that a wide range of different vehicles other than mowers could be fabricated as disclosed herein. The term "utility vehicle" will be used herein to denote any vehicle utilizing aspects of the invention as disclosed.

Utility vehicle 10 has a front end 10a, a rear end 10b, a top 10c, a bottom 10d, a right side 10e, and a left side 10f. The front end 10a and rear end 10b define a longitudinal direction between them. The top 10c and the bottom 10d define a vertical direction between them. The right side 10e and left side 10f define a horizontal or lateral direction between them.

Figure 13:
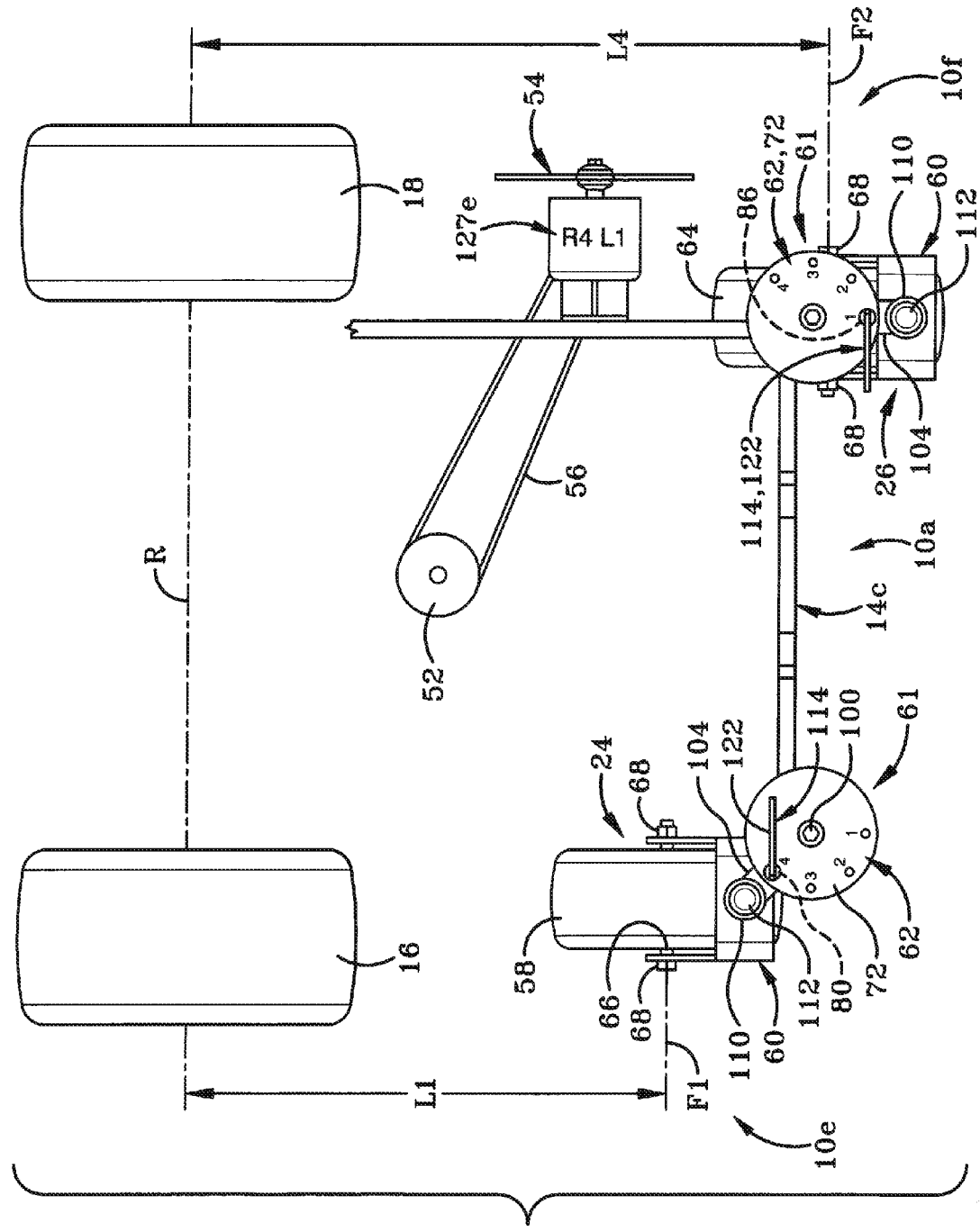
FIG. 13 is a top view of the front wheel assemblies and the rear wheels showing the relative distances between the various wheels when the right wheel assembly is in the first position and the left wheel assembly is in a fourth position so that the right and left front wheels are out of lateral alignment with each other and the utility vehicle is configured to have a side-mounted attachment secured to the frame.

Utility vehicle 10 may be used for a wide variety of purposes by selectively attaching thereto any one of a number of different attachments including a mower assembly, a snowplow blade, a snow blower or snow thrower, an edger, a forklift assembly, a brush-cutter, a roller assembly, an aerator, a vacuum assembly, and so on. As will be understood, these various attachments are of a wide range of different weights. By way of example, FIG. 1 illustrates utility vehicle 10 having a snowplow blade 12 engaged therewith and FIG. 13 shows an edger assembly 54 attached thereto (with most of the vehicle 10 omitted for clarity). Obviously, snowplow blade 12 is much heavier than edger assembly 54 and thus the center of gravity of vehicle 10 will be in two different locations in these two instances. Furthermore, the weight ratio, i.e., the balance between the weight of the overhung load (the blade 12 or edger assembly 54) versus the weight of the rest of the vehicle plus the operator on platform 22, is changed when the different attachments 12, 54 are engaged with vehicle 10. This weight ratio has to be separately balanced for each attachment 12 or 54 so that the performance of the vehicle 10 is optimized for the particular attachment. This optimizes the performance of the attachment. The manner of achieving this is described further herein.

Figure 4:
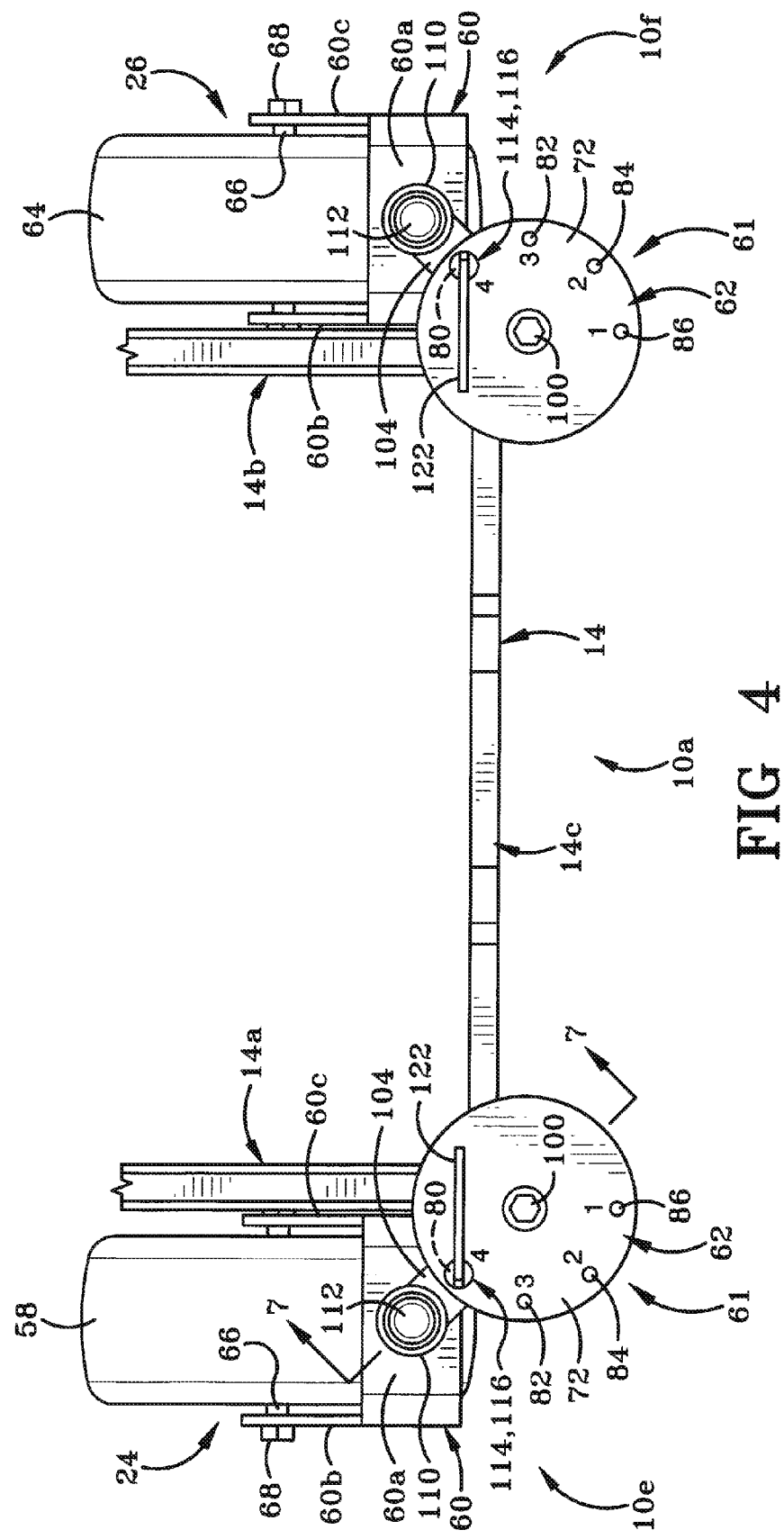
FIG. 4 is a top view of the right front wheel assembly taken along line 4-4 of FIG. 3.

As is best seen in FIGS. 1 and 4, utility vehicle 10 includes a rigid frame 14, typically fabricated from metal and extending from front end 10a to rear end 10b and from right side 10e to left side 10f. Frame 14 includes, amongst other components, right and left side members 14a, 14b, a front member 14c and upstanding members 14d which extend outwardly and upwardly from left and right side members 14d. Right and left side members 14a, 14b extend longitudinally from proximate front end 10a to proximate rear end 10b. Front member 14c extends horizontally or laterally between right and left side members 14a, 14b. It will be understood that frame 14 may include other cross-braces and members.

A support member 15 is pivotally secured to a portion of frame 14 and extends longitudinally forwardly toward front end 10a. Any attachments which are secured to front end 10a of vehicle 10 are detachably engaged with support member 15 at an engagement point (the location of a locking mechanism 17 in FIG. 1, for instance). Thus, as illustrated in FIG. 1, snowplow blade 12 is secured to a front end of support member 15 by locking mechanism 17, in this instance a locking pin 17. Blade 12 includes a shaft 12a which extends rearwardly and engages within a bore (not shown) of support member 15. Pin 17 is selectively inserted through aligned holes (not shown) in the blade's shaft 12a and support member 15. It should be noted that a series of spaced apart holes, such as hole 12b, are defined in shaft 12a. Any one of these holes, such as 12b, may be brought into alignment with a hole in support member 15 and the pin 17 inserted therethrough and secured in place in an appropriate way, such as by way of a clevis pin. Thus the distance "D1" (FIG. 1) between blade 12 and vehicle 10 may be varied as desired and in accordance with the particular attachment being engaged with vehicle 10. Increasing distance "D1" moves the attachment, blade 12, further from the vehicle's body and increases the overhung load. Decreasing distance "D2" moves the blade 12 closer to the vehicles body and decreases the overhung load. The ability to change distance "D1" in response to the overhung load resulting from the engagement of any particular attachment with vehicle 10, as well as changing the wheel base and wheel stance of vehicle 10, tends to improve the performance of that particular attachment. So, for example, in the case of blade 12, balancing the weight ratio ensures that vehicle 10 will move stably over surface 28 and thus blade 12 will remain in adequate contact with surface 28 and be more effective at removing snow therefrom.

If a different attachment is to be secured to front end 10a, locking mechanism 17 is disengaged, snowplow blade 12 is removed and the different attachment is secured to support member by engaging locking mechanism 17.

Utility vehicle 10 is provided with powered (or driven) right and left rear wheels 16, 18 (FIGS. 1 and 9) which are each operatively mounted on frame 14 via an axle 16a (FIG. 1). (Axle 16a may be a single axle which extends between right and left rear wheels 16, 18 or each wheel 16, 18 may have its own axle 16a.) Rear wheels 16, 18 rotate about an axis "R" (FIG. 9) which extends through axle 16a. Preferably, a mud-flap 20 is positioned adjacent a top surface and interior side surface of each of right and left rear wheels 16, 18 to prevent mud and water from splashing upwardly toward an operator standing on a platform 22 at rear end 10b. Mud-flaps 20 and platform 22 are all mounted on frame 14. (It will be understood that a seat may be provided on utility vehicle 10 instead of platform 22 and this seat would also be mounted on frame 14.)

Non-powered right and left front wheel assemblies 24, 26 are mounted on frame 14 proximate front end 10a of utility vehicle 10. Wheel assemblies 24 and 26 will be described in greater hereinafter. In accordance with an aspect of the invention, vehicle 10 includes a mechanism for adjusting the wheel base and adjusting the wheel stance which will ensure the optimum balance between the ratio of the weight at a front or side of vehicle 10 due to a particular attachment with the weight of the rest of the vehicle 10 plus the operator, relative to the performance of the attachment. The term "wheel base" denotes the distance between rear wheels 16, 18 and front wheel assemblies 24, 26. The term "wheel stance" denotes the distance between right wheel assembly 24 and left wheel assembly 26. In the vehicle 10 illustrated herein, the distance between rear wheel 16 and rear wheel 18 is not adjustable simply because the majority of the vehicle's weight is typically carried toward rear end 10b. This weight includes the weight of the engine and of the operator. It will be understood, however, that in other vehicles it may be desirable to adjust the distance between the left and right rear wheels in the manner that will be described herein.

Rear wheels 16, 18 and right and left wheel assemblies 24, and 26 are positioned to engage a ground surface 28 and roll on that ground surface 28 to move the utility vehicle 10 in a forward or rearward direction as well as to the left or right. Preferably, utility vehicle 10 is a zero-turning radius machine but it will be understood that utility vehicle 10 may be differently configured to enable it to give it a wider turning range.

Figure 9:
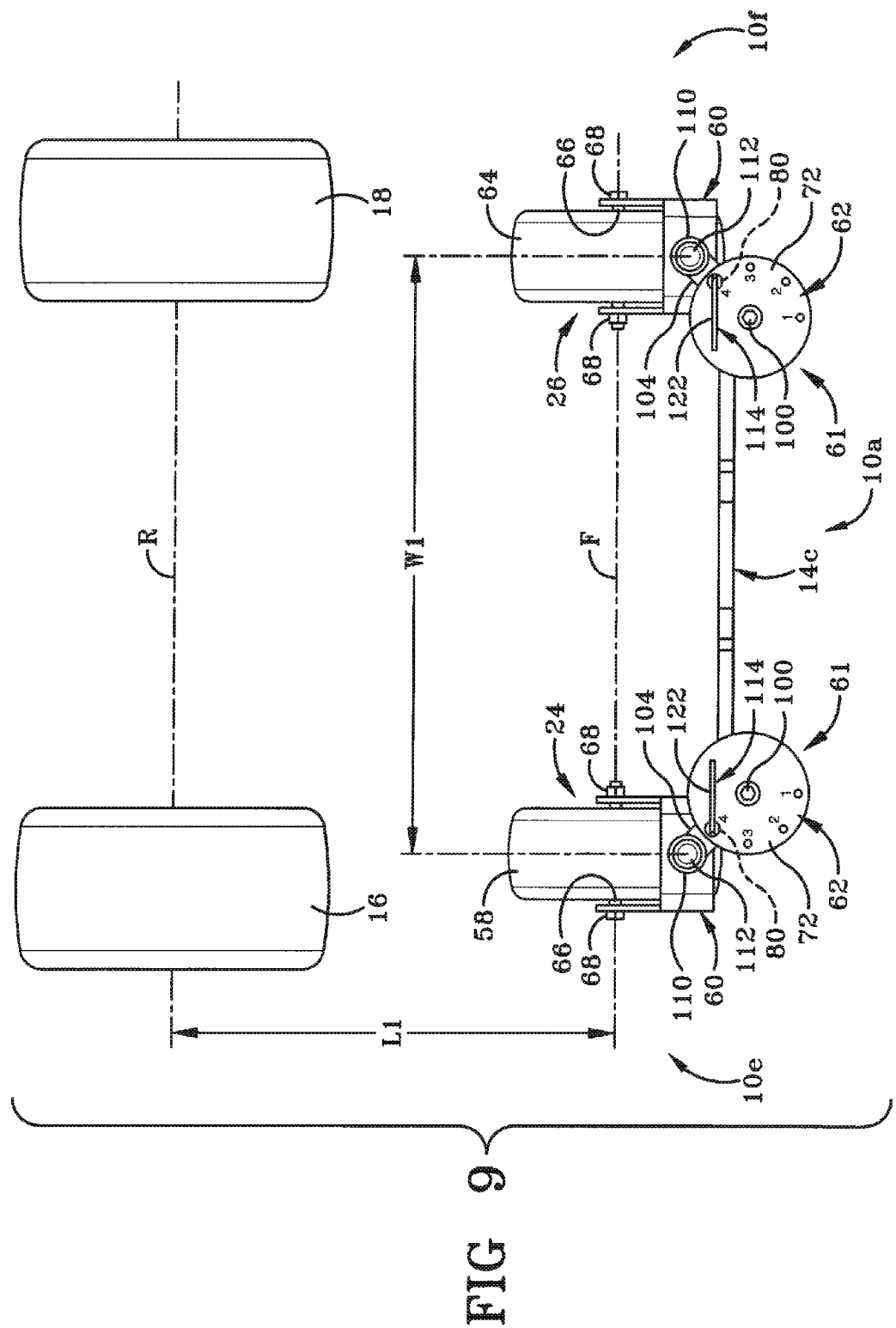
FIG. 9 is a top view of the front wheel assemblies and the rear wheels showing the relative distances between the various wheels when each of the right and left front wheel assemblies are in a first position.

Various other components of utility vehicle 10 are mounted on frame 14. These include a gas tank 30, an engine 32, an oil tank 34 with an oil filter 36 for the engine 32, an air filter 37, and a muffler 38 to dampen noise. A control panel 40 is also mounted on an upstanding member 14d of frame 14 and is used to control various functions of utility vehicle 10. One or more hand-operable levers 42 are operatively engaged with rear wheels 16, 18. Only one of these levers 42 is illustrated in FIGS. 1 and 9, namely the lever which controls the right rear wheel 16. It will be understood that a similar lever is provided for controlling the left rear wheel 18. A console including a joystick 44 is also provided on utility vehicle 10. Joystick 44 is used to operate a hydraulic system that controls the functioning of snowplow blade 12 or any other attachment engaged with utility vehicle 10. Much of the hydraulic system provided on vehicle 10 is not illustrated in FIGS. 1 and 9 as the provision and operation of the same is well known in the art and is not particularly relevant to the present invention. Two components of the hydraulic system which are illustrated in the figures are the hydraulic cylinder 46 with piston 48 and a hydraulic pump 50. Cylinder 46 and piston 48 are operatively engaged with a region of support member 15 and are activated to raise and lower support member 15 as will later be described herein.

Another component which is mounted on frame 14 is a pulley 52 (FIGS. 1, 9 and 11) which is useful for operating a side-mounted attachment such as the edger 54 shown in FIG. 13. A drive belt 56 is engaged with pulley 52 to drive edger 54, as will be later described herein.

As indicated previously herein, right and left front wheel assemblies 24, 26 are engaged with frame 14. Right and left front wheel assemblies 24, 26 are mirror images of each other but the components and functioning of those components are substantially identical. Only right front wheel assembly 24 will therefore be described herein but it will be understood that the left front wheel assembly 26 is substantially identical in structure and function.

Right front wheel assembly 24 is a caster assembly and includes a right front wheel 58 and a yoke 60 which is secured thereto in such a manner that wheel 58 is able to pivot through 360° about a vertical axis "Y". In accordance with an aspect of the invention, right front wheel assembly 24 is operatively engaged with frame 14 via an adjustment assembly 61. The adjustment assembly 61 includes a guide plate 62, an arm 104 (with a sleeve 110 at one end which engages yoke 60), and a pin 114. All of these components will be further described herein.

Figure 2:
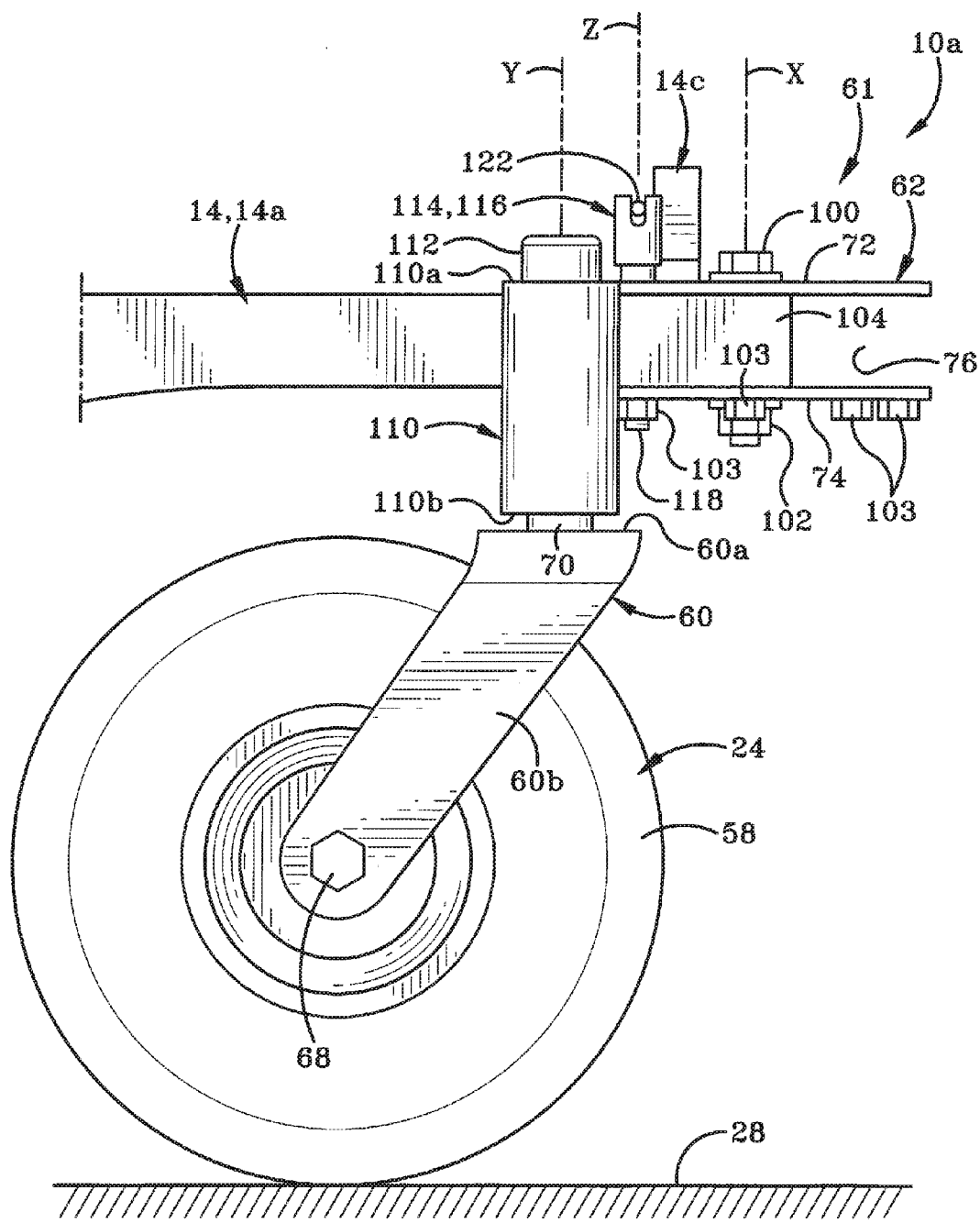
FIG. 2 is an enlarged right side view of a fight front wheel assembly of the utility vehicle of FIG. 1.
Figure 3:
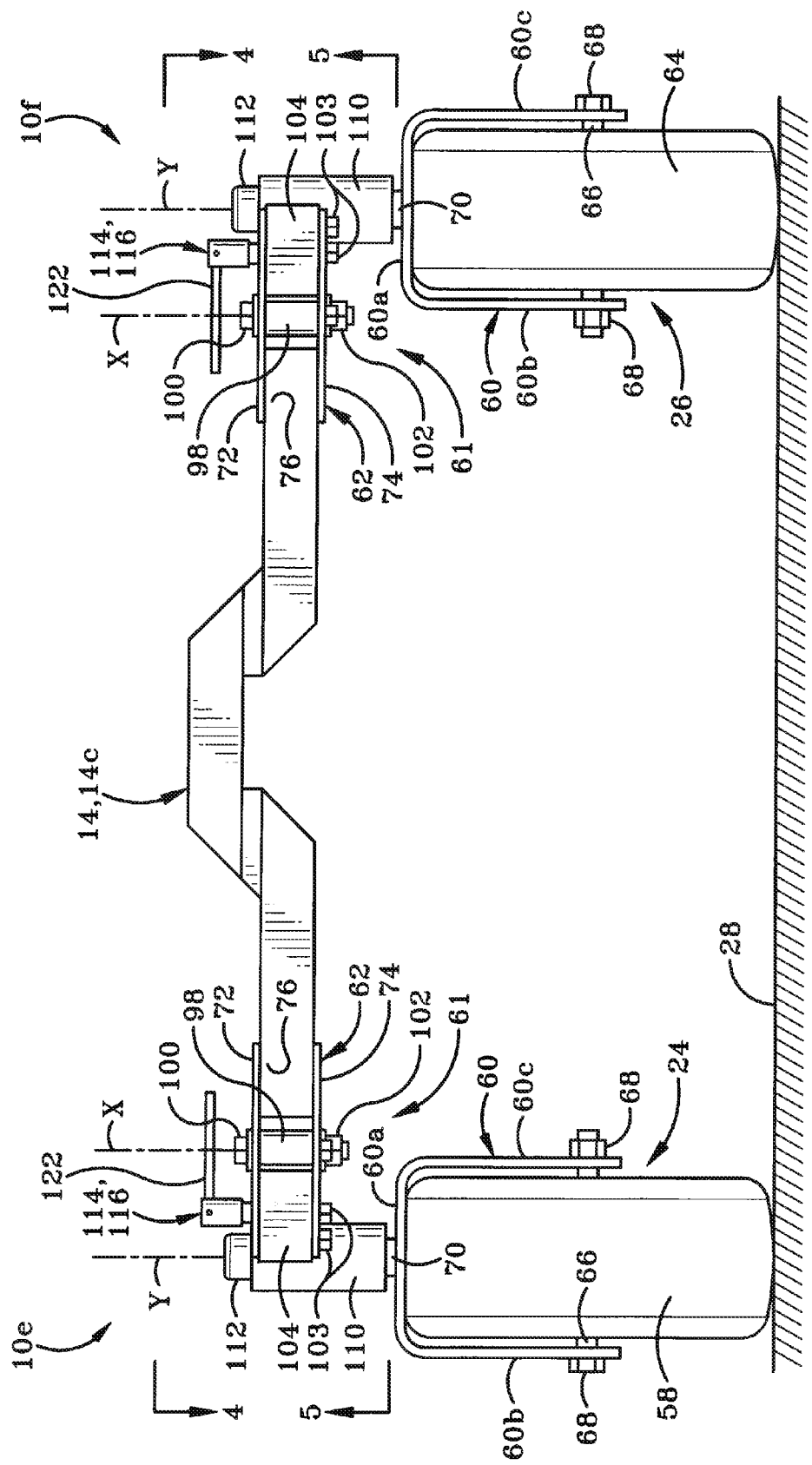
FIG. 3 is a front view of the right front wheel assembly with the rest of the utility vehicle omitted for the sake of clarity.
Figure 6:
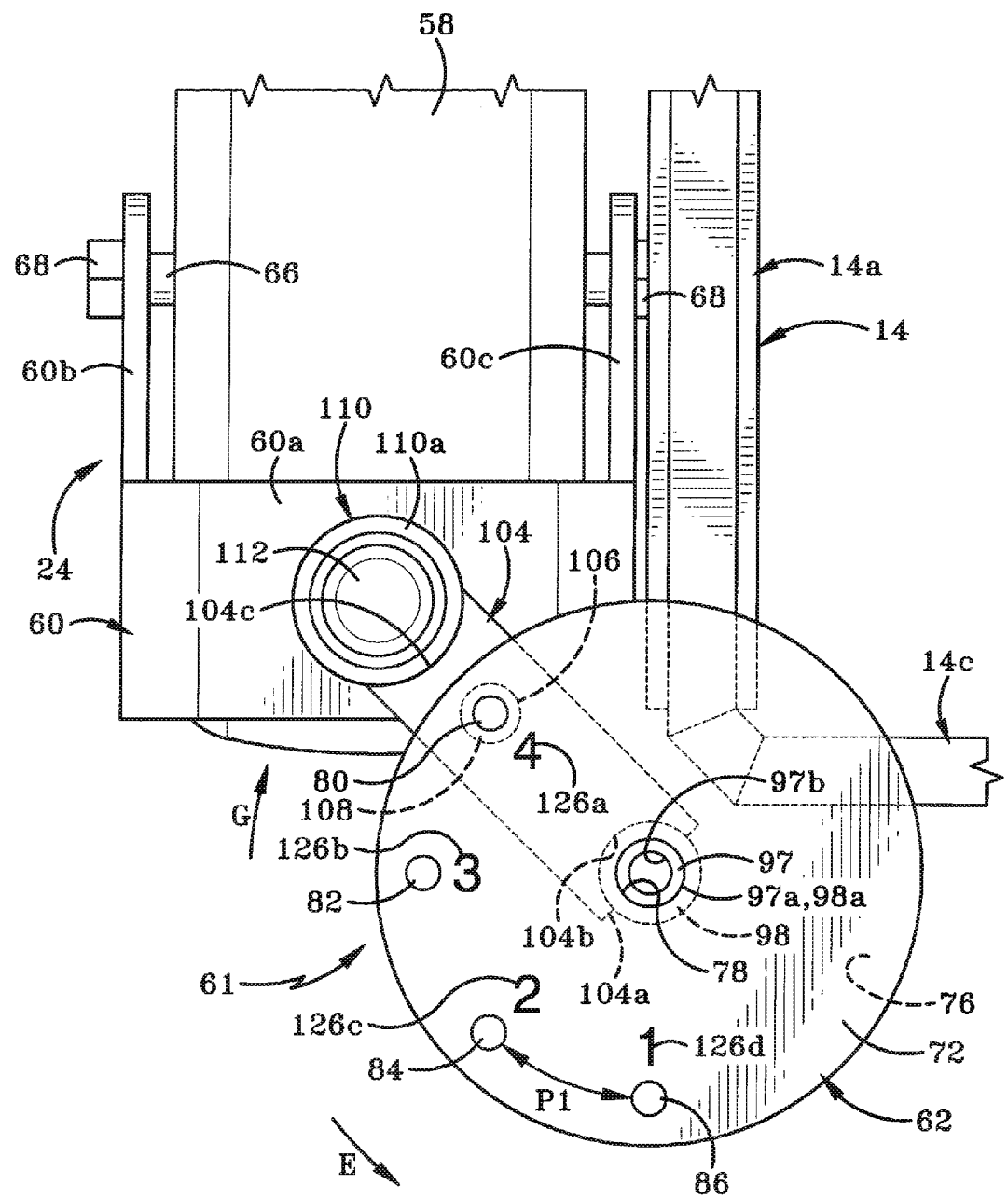
FIG. 6 is an enlarged top view of the right front wheel assembly with the pin removed therefrom for clarity.

Right front wheel 58 and left front wheel 64 (FIG. 3) are of substantially the same diameter as each other and this diameter is smaller than the diameter of right and left rear wheels 16, 18. Yoke 60 comprises a substantially U-shaped bracket having a base 60a and two arms 60b, 60c which extend downwardly and rearwardly from base 60a, as best seen in FIGS. 2, 3, and 6. Holes (not shown) are defined in a lower region of each arm 60b, 60c and these holes are laterally aligned with each other. A fastener 68 secures wheel 58 to yoke 60. A shaft 66 of a bolt 68 is passed through these aligned holes and through a hole (not shown) in wheel 58. A nut is then engaged with shaft 66 to secure bolt 68 in place. The shaft 66 thus becomes an axle for wheel 58 and wheel 58 rotates about an axis passing through this shaft. This axis is represented in FIG. 9 by the reference character "F".

A cylindrical shaft 70 extends upwardly and outwardly from base 60a of yoke 60 and is disposed substantially at right angles to an upper horizontal surface of base 60a. This can be seen in FIG. 3.

Guide plate 62 comprises two spaced-apart discs 72, 74 which are disposed one above the other and preferably are aligned with each other. Discs 72 and 74 are substantially parallel and define a gap 76 therebetween. Portions of frame 14a, and 14c are received in gap 76 and are welded to discs 72 and 74 thereby maintaining discs 72, 74 in a fixed relationship relative to frame 14. This is illustrated in FIG. 6.

Figure 5:
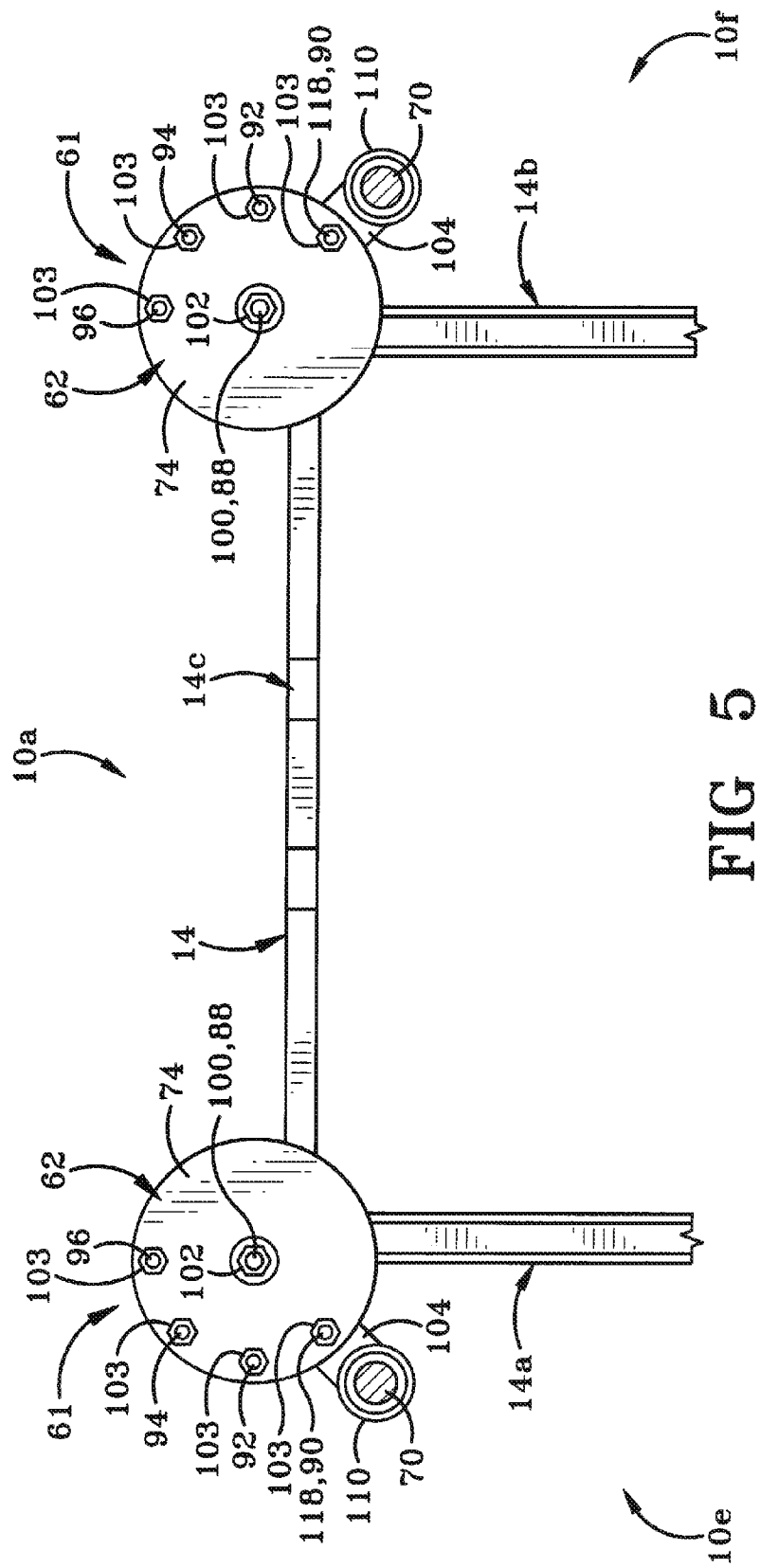
FIG. 5 is a bottom view of the right front wheel assembly taken along line 5-5 of FIG. 3.

Referring to FIGS. 5 and 6, each disc 72, 74 is substantially identical in shape and preferably is circular. A central hole 78 (FIG. 6) is defined in plate 72 and one or more additional holes are defined a spaced distance inwardly from a circumferential outer edge 72a of disc 72. Preferably, disc 72 defines four such holes therein, which holes are identified by the reference characters 80, 82, 84, and 86. Holes 80, 82, 84, and 86 are all of substantially the same diameter and these holes are spaced at regular intervals from each other along an arc. Preferably, the holes 80-86 are spaced about a distance "P1" (FIG. 6) apart from each other along the arc. The distance "P1" preferably is about 4 inches. It should be noted that the distance "P1" between adjacent holes 80-86 can convert about 200 pounds or more capacity depending on which position right and front wheel assemblies are adjusted to, as will be described hereafter.

Figure 7:
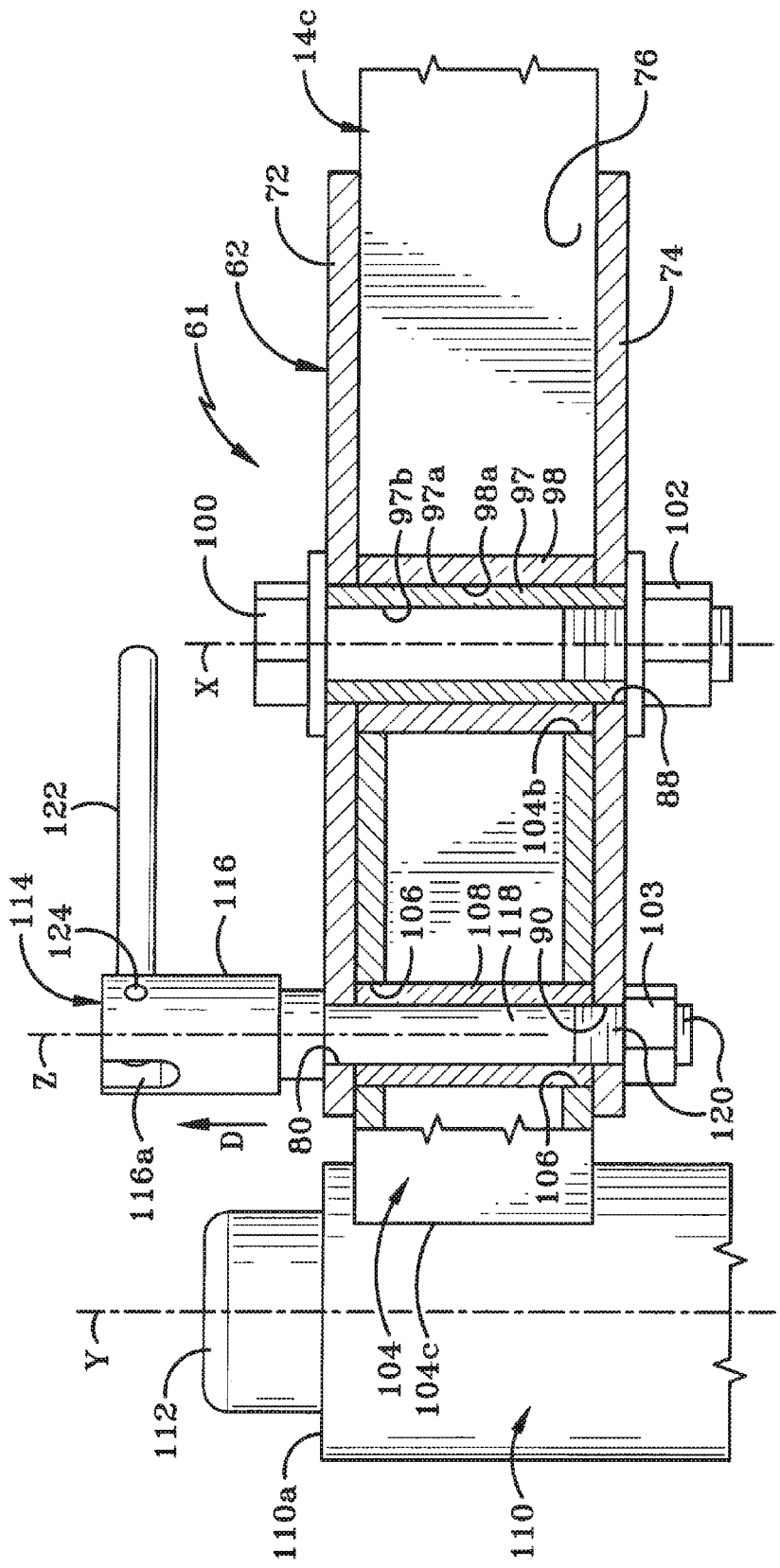
FIG. 7 is a partial cross-sectional view of the adjustment assembly and part of the yoke taken along line 7-7 of FIG. 4.

Similar holes are defined in plate 74. So, plate 74 defines a central hole 88 (FIG. 5) and four additional holes 90, 92, 94, and 96 therein. Hole 78 is vertically aligned with hole 88, hole 80 is vertically aligned with hole 90, hole 82 is vertically aligned with hole 92, hole 84 is vertically aligned with hole 94, and hole 86 is vertically aligned with hole 96. Preferably, a tube 97 extends through holes 78 and 88 and is welded in place. A bushing 98 surrounds tube 97 and extends between an interior surface of plate 72 and an interior surface of plate 74. The interior surface 98a of bushing 98 is adjacent the exterior surface 98a of tube 97. Tube 97 defines a bore 97b through which a threaded bolt 100 is received. A threaded nut 102 secures bolt 100 in place. Bolt 100 and nut 102 keep plates 72 and 74 aligned and secured together. As best seen in FIG. 7, an axis "Y" extends through the bore 97b of tube 97 and from upper plate 72 through to lower plate 74. Guide plate 62 acts as an anchor for the adjustment of the position of wheel 58.

Referring to FIG. 5 it can be seen that a plurality of nuts 103 is welded to the underside of plate 74. Each nut 103 is disposed such that an aperture (not numbered) defined therein aligns with one of the respective hole 90, 92, 94, or 96 in plate 74.

As indicated above, adjustment assembly 61 includes an arm 104 which is adjustably engaged with guide plate 62. As shown in FIG. 6, arm 104 has a first end 104a, including a curved region 104b, and a second end. As shown in FIG. 7, arm 104 is complementary in height to the gap 76 between plate 72 and plate 74. First end 104a of arm 104 is received into gap 76 and curved region 104b, which is complementary to a portion of the exterior surface of bushing 98, is positioned adjacent bushing 98 and is welded thereto. Arm 104 defines a pair of aligned apertures 106 in its upper and lower surfaces (FIG. 7) and a bushing 108 extends from a first aperture 106 to the second aperture 106 and is welded to arm 104. Arm 104 is rotatable about axis "X" which passes through bolt 100. As arm 104 rotates, about axis "X", apertures 106 therein are selectively alignable with one of the pairs aligned holes 80/90, 82/92, 84/94, or 86/96 in guide plate 62.

Second end 104c of arm is welded to sleeve 110. FIG. 6 shows that second end 104c includes a curvature that is complementary to the exterior surface of sleeve 110. Although not illustrated herein, it will be understood that sleeve 110 defines a bore therethrough that extends from an upper end 110a (FIG. 2) on sleeve 110 through to a lower end 110b thereof. Shaft 70 of yoke 60 is received through this bore. Shaft 70 is inserted into an opening (not shown) in the lower end 110b of sleeve 110. A cap 112 is inserted into an opening (not shown) in upper end 110a of sleeve 110 to lock shaft 70 in place within sleeve 110. FIG. 2 shows an axis "Y" passing centrally through the bore of sleeve 110 and running from upper end 110a of sleeve 110 through to lower end 110b thereof. Shaft 70 and therefore yoke 60 and wheel 58 are rotatable about this axis "Y". In particular, shaft 70, yoke 60, and wheel 58 are able to rotate through 360°.

Pin 114 (FIG. 7) is selectively removably engageable with one of the aligned pairs of holes in guide plate 62. Pin 114 comprises a head 116 having a shaft 118 extending outwardly and downwardly therefrom. An end of shaft 118 is provided with threads 120. Shaft 118 is of a diameter sufficient to permit it to pass through any of the aligned pairs of holes 80/90, 82/92, 84/94, or 86/96. Furthermore, shaft 118 and threads 120 are configured for mating engagement with any of the nuts 103 disposed adjacent holes 90, 92, 94 or 96. Pin 114 further includes a U-shaped slot 116a defined in head 116. One end of a handle 122 is received through slot 116a and a fastener 124 locks that end of the handle 122 to head 116. The handle 122 provides an easier means for a user to grasp in order to manipulate pin 114.

Referring to FIG. 6 it will be seen that an indicator is marked on upper surface of upper plate 72 adjacent each of holes 80, 82, 84, and 86. The indicator adjacent hole 80 is identified by reference character "126a", the indicator adjacent hole 82 is identified by the reference character "126b; the indicator adjacent hole 84 is identified by the reference character "126c"; and the indicator adjacent hole 86 is identified by the reference character "126d". These indicators 126a-126d are visible to the operator and enable him or her to select which of the holes 80-86 to engage pin 114 therein, as will be hereafter described.

Figure 10:
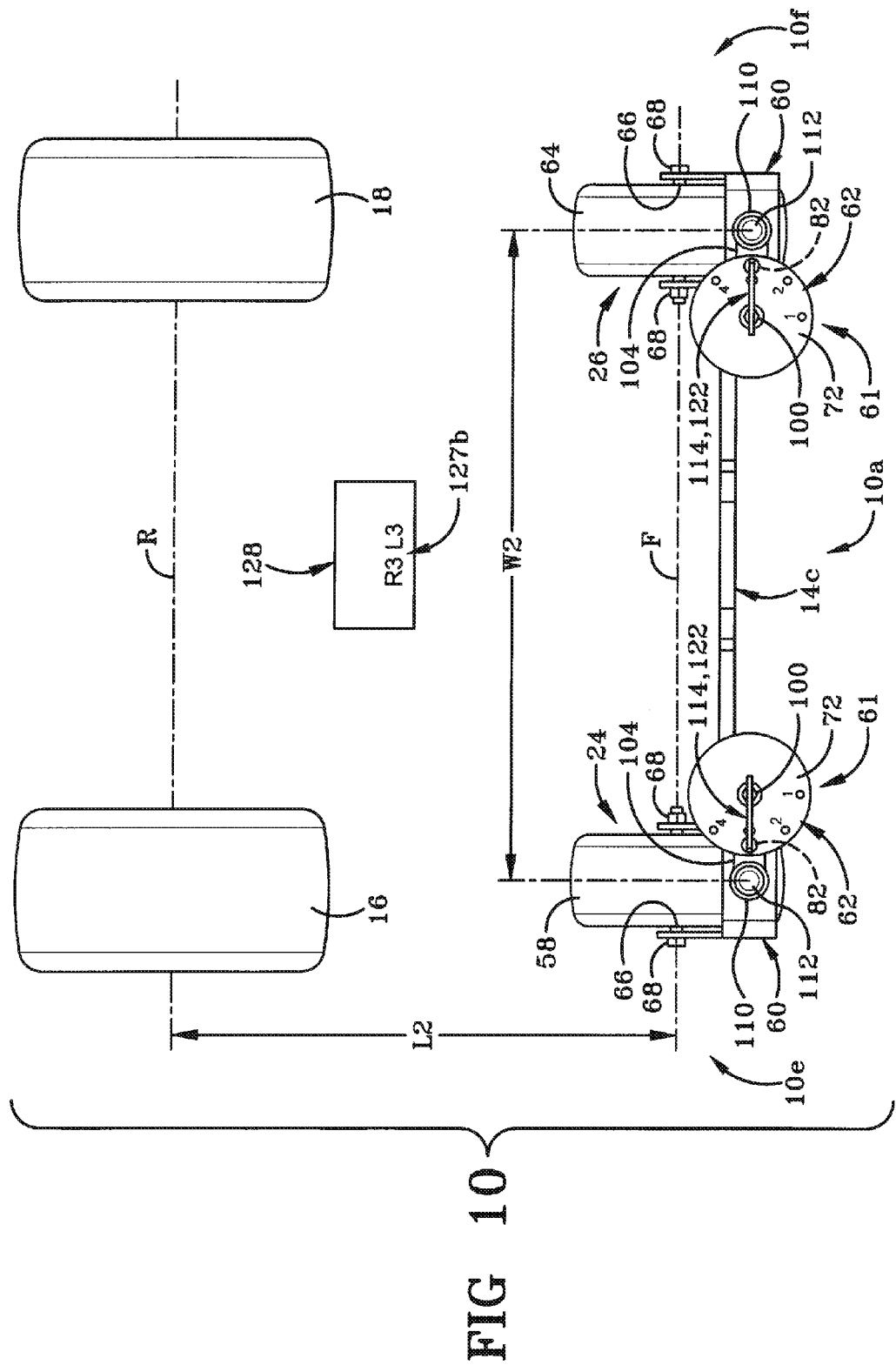
FIG. 10 is a top view of the front wheel assemblies and the rear wheels showing the relative distances between the various wheels when each of the right and left front wheel assemblies are in a second position.
Figure 11:
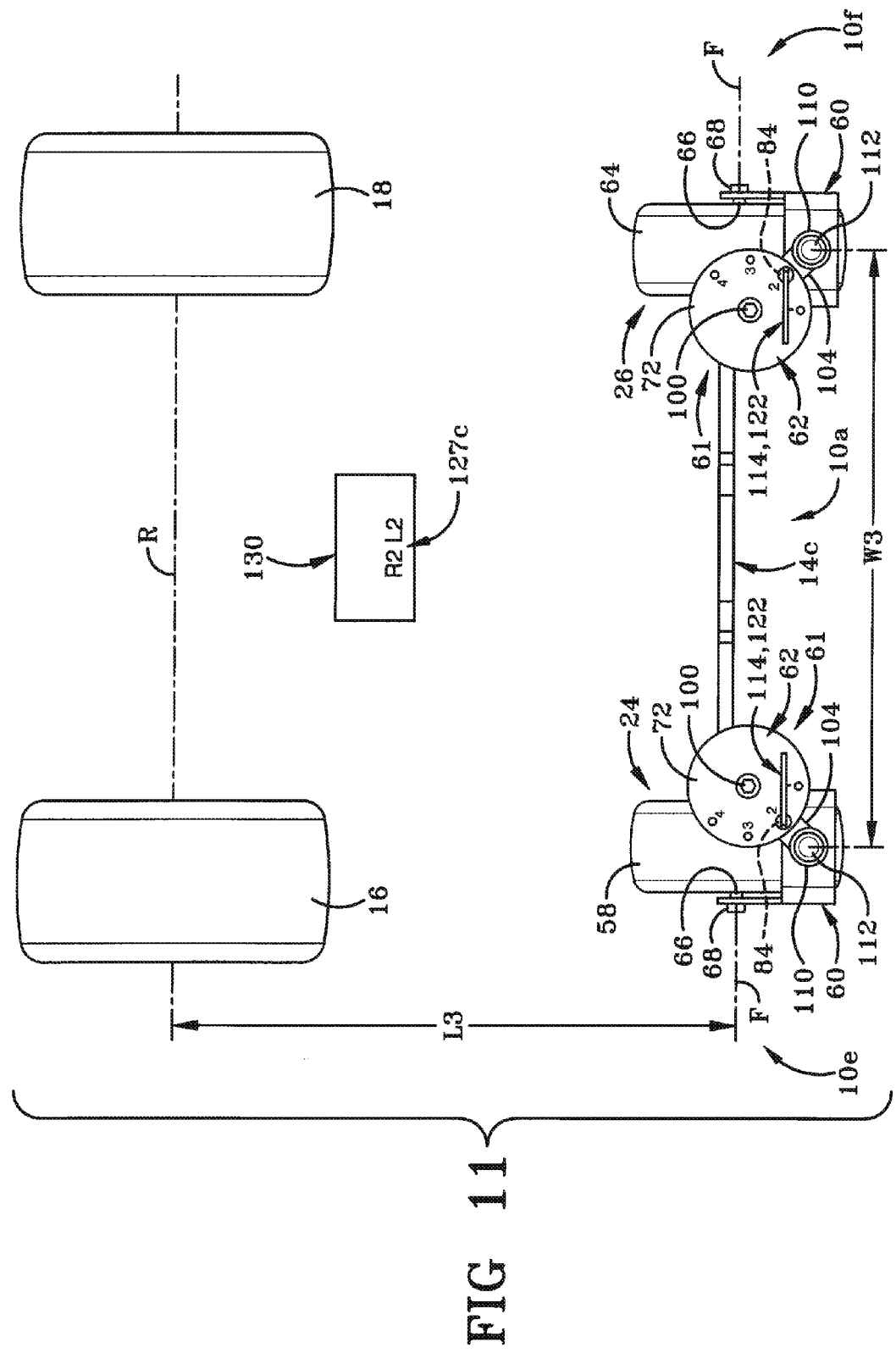
FIG. 11 is a top view of the front wheel assemblies and the rear wheels showing the relative distances between the various wheels when each of the right and left front wheel assemblies are in a third position.
Figure 12:
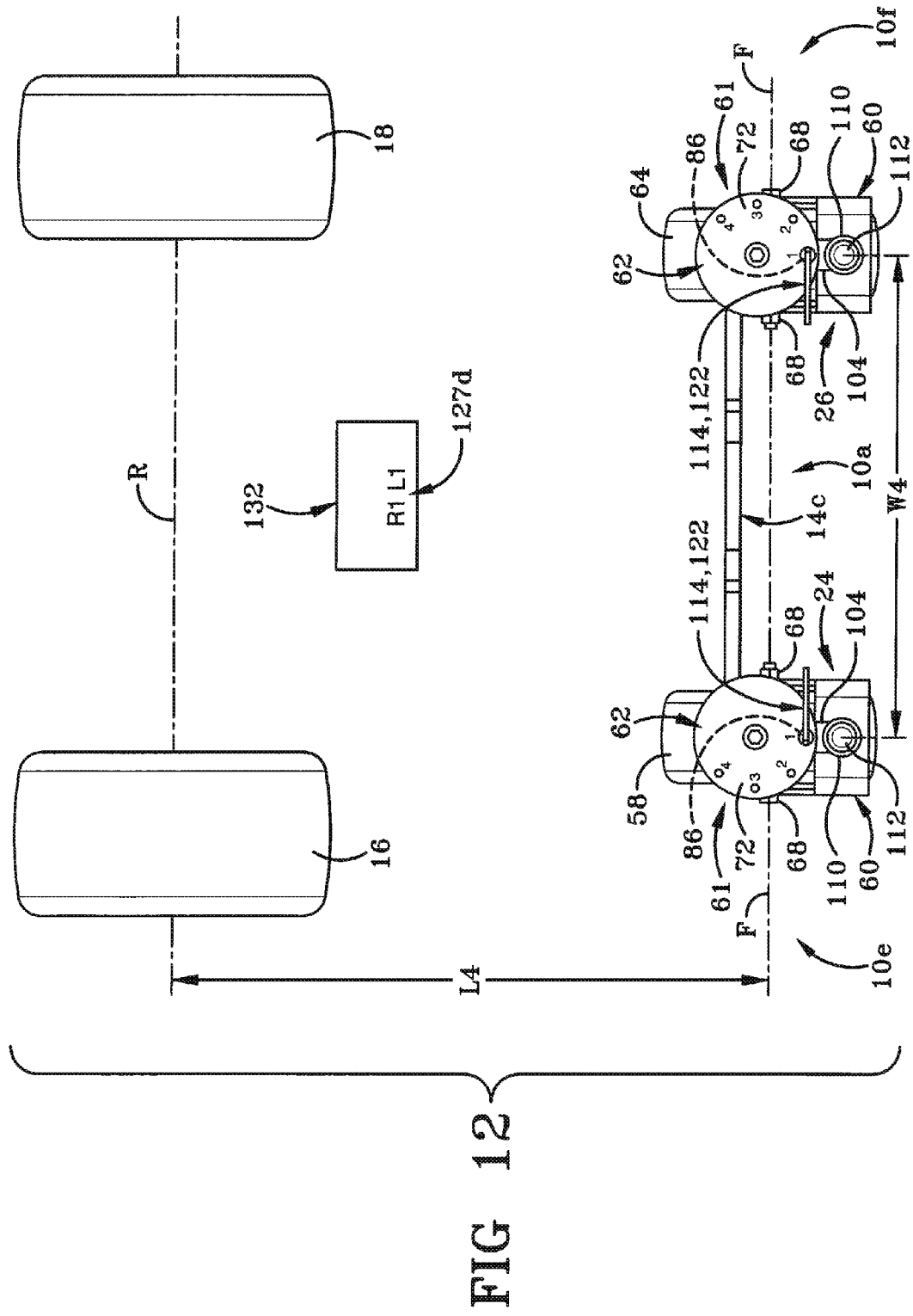
FIG. 12 is a top view of the front wheel assemblies and the rear wheels showing the relative distances between the various wheels when each of the right and left front wheel assemblies are in a fourth position.

Referring to FIGS. 9-13, utility vehicle 10 is used in the following manner. As indicated previously herein, a variety of different attachments, such as snowplow blade 14 (FIG. 1), or edger 54 (FIG. 13) are selectively engageable with support member 15. FIGS. 10, 11, and 12 also show boxes 128, 130, and 132 respectively which are meant to represent other attachments which are potentially engageable with utility vehicle 10. These other attachments could be a forklift assembly, mulcher, snow blower, mower assembly, These boxes 128, 130, 132 are illustrated in a position between rear wheels 16, 18 and front wheel assemblies 24, 26 but the placement is for ease of illustration only and does not represent where the attachments 128, 130 or 132 will be engaged with utility vehicle. The attachments 128, 130 and 132 may be engaged with front end 10a, rear end 10b, with one or the other sides 10c, 10d or even an underside of vehicle 10.

Each of the attachments 14, 54, 128, 130, 132 is of a different weight and will affect the weight ratio of vehicle 10 differently. Each attachment will therefore have a different impact on the vehicle's stability and performance and thereby on the attachment's own performance. Additionally, differently weighted attachments will place different stresses on frame 14. In order to address some of these issues, and in accordance with an aspect of the present invention, right and left front wheel assemblies 24, 26 are adjustable to change the vehicle's wheel base and/or wheel stance. In particular, wheel assemblies 24, 26 are individually and separately adjustable. Specifically, the adjustment of wheel assemblies 24 and 26 is a manual operation performed by the operator of utility vehicle 10. In accordance with an aspect of the present invention, each of front wheel assemblies 24 and 26 may be moved toward or away from rear wheels 16, 18 and/or toward or away from each other. Each front wheel assembly is independently selectively adjustable.

FIG. 9 shows the wheels of vehicle 10 when a first attachment, such as snowplow blade 14, is engaged therewith. Wheel assemblies 24 and 26 are in a first position where wheel assemblies 24, 26 are aligned with each other along axis "F" and are disposed in front of rear wheels 16, 18. Rear wheels 16, 18 are aligned along axis "R". This first position is also illustrated in FIGS. 6 and 7 where it can be seen that hole 106 in arm 104 is aligned with holes 80/90 in guide plate 62; and pin 114 is inserted through these aligned holes. FIG. 6 shows that the arm 104 is positioned so that the holes 106 therein are aligned with the holes situated adjacent indicator 126a (FIG. 6)—i.e., the position numbered "4" as marked on guide plate 62. FIG. 9 also shows that arm 104 of wheel assembly 24 is situated at an 11-o'clock position on plate 72 and arm 104 of wheel assembly 26 is situated at a 1-o'clock. Wheel assembly 24 is thus spaced a distance "W1" laterally from wheel assembly 26. Additionally, the aligned wheel assemblies 24, 26 are spaced a distance "L1" longitudinally from rear wheels 16, 18. Preferably, the distance "W1" is about 39½ inches and the distance "L1" is about 29 inches. Most particularly, it should be noted that the change in the distance "W1" and in the distance "L1" occurs simultaneously. It should be noted that the adjustment assembly 61 will be set at position "4" when the heaviest attachment, snowplow blade 14, is engaged with vehicle 10.

If the attachment 14 engaged with utility vehicle 10 needs to be replaced with another of the attachments 54, 128, 130, 132, it may be necessary for the operator to make adjustments to the position of one or both front wheel assemblies 24, 26. These adjustments change the relative distance between right front wheel assembly 24 and left front wheel assembly 26; and/or between one or both of wheel assemblies 24, 26 and rear wheels 16, 18. The adjustment is made so that the utility vehicle 10 will be best able to engage and operate the selected new attachment while remaining as stable Adjustments are made to front wheel assemblies 24, 26 which will change the wheel base and/or wheel stance of vehicle 10 so that the weight of the new attachment will not adversely affect the vehicle's center of gravity or the weight ratio, and thereby affect the performance of the vehicle and/or attachment.

So, if the operator is going to change attachment 14 to use vehicle 10 for another function, wheel assemblies 24, 26 must be adjusted. The adjustment may be made before the new attachment is engaged with vehicle or the adjustment may be made after the new attachment is engaged with vehicle (but before the vehicle is used to operate the new attachment.) If the operator determines it is necessary to move the wheel assemblies 24, 26 from the position "4" illustrated in FIG. 9 to the position illustrated in FIG. 10, i.e., the position "3" marked on guide plate 62, the first step in making this adjustment is to take the weight of utility vehicle 10 off wheel assemblies 24, 26. This is done by the operator moving joystick 44 (FIG. 8) forwardly in the direction of arrow "A". This motion actuates the hydraulic system and in particular causes piston 48 to extend outwardly from cylinder 46 in the direction of arrow "B". The extension of piston 48 causes support member 15 to pivot downwardly in the same direction as arrow "B" causing front end 10a of utility vehicle 10 to be raised a small distance off ground surface 28 in the direction of arrow "C". As front end 10a is raised, wheels 58, 64 are lifted off the ground in the direction of arrow "C". Because the weight of vehicle 10 is no longer is borne by wheels 58, 64, front wheel assemblies 24, 26 may now be adjusted.

Referring to FIGS. 6, 7, 9 and 10, pin 114 is disengaged from guide plate 62. FIGS. 7 and 9 show pin 114 engaged in holes 80, 106, 90 of guide plate 62. In other words, pin 114 is disposed in the hole adjacent position "4" as marked on guide plate 62 in order for attachment 14 to be engaged with vehicle 10. Grasping handle 122, the operator will rotate pin 114 about an axis "Z" in a first direction that will disengage threaded shaft 118 of pin 114 from its engagement with the threads of nut 103. Once threads 120 are disengaged from nut 103, pin 114 is lifted out of aligned holes 80, 106, 90 in the direction indicated by arrow "D". The operator will then grasp wheel/yoke 58/60 and pivot the same about axis "X" in a first direction indicated by arrow "E" (FIG. 6). (Obviously, adjustment of wheel/yoke 64/60 on left wheel assembly 26 will be performed in an opposite direction to arrow "E" since the two assemblies are mirror images of each other.) Wheel/yolk 58/60 is moved in the direction of arrow "E" until hole 106 aligns with holes 82, 92, for example. In other words, wheel/yolk 58/60 is pivoted until hole 106 is aligned with the hole represented by indicator 126b (FIG. 6)—i.e., position "3" as marked on guide plate 62. This is the position suitable for attachment 128 to be engaged with vehicle 10. Shaft 118 of pin 114 is then inserted into the aligned holes 82, 106, 92 and into the bore of the nut 103 disposed adjacent hole 92. Grasping handle 122, pin 114 is rotated about axis "Z" in a second direction which will engage threads 120 on shaft 118 with the threads of the nut 103 disposed adjacent hole 92. When pin 114 is fully engaged with guide plate 62 via nut 103, front wheel assemblies 24, 26 are in the positions illustrated in FIG. 10. In this position "3", arm 104 is at a 3-o'clock position for right front wheel assembly 24 and at a 9-o'clock position for left front wheel assembly 26. The distance between rear wheels 16, 18 and front wheel assemblies 24, 26 has changed from "L1" to "L2"; and the distance between wheel assemblies 24 and 26 has changed from "W1" to "W2". It can be seen comparing FIGS. 9 and 10 that the distance "W2" is greater than the distance "W1" and the distance "L2" is greater than distance "L1". The increase in each distance is the result of the difference in the relative positions of the first set of aligned holes 80, 106, 90 and the second set of aligned holes 82, 106, 92 on guide plate 62, as will be described further herein. In an aspect of the invention, distance "W2" is about 43 inches and distance "L2" is about 33 inches. Thus, the wheel stance has increased by 3½ inches to about 4 inches, and the wheel base has increased by 4 inches relative to position "4". The change in the distance "W2" and in the distance "L2" occurs simultaneously.

The operator may furthermore or alternatively pivot wheel/yoke 58/60 in the direction "E" to align the hole 106 in arm 104 with either of holes 84/94 (position "2" adjacent indicator 126*c*) or 86/96, (position "1" adjacent indicator 126*d*) depending on the wheel base and wheel stance required for any particular one of attachments 54, 128, 130, or 132.

FIG. 11 shows front wheel assemblies 24, 26 both adjusted to position "2" for the engagement of attachment 130. Pin 114 has been previously removed from either of positions "4" or "3" and each of wheel/yoke 58/60 and wheel/yoke 64/60 has been pivoted to bring hole 106 into alignment in holes 84/94 (adjacent indicator 126*c*). It can be seen that the distance between rear wheels 16, 18 and wheel assemblies 24, 26 has changed to "L3" and the distance between right front wheel assembly 24 and left front wheel assembly 26 has changed to "W3". Additionally, Arm 104 sits at about the 7-o'clock position for right front wheel assembly 24 and arm 104 sits at about the 5-o'clock position for left front wheel assembly 26. In an aspect of the invention, distance "W3" is about 39½ inches and distance "L3" is about 37 inches. Thus, relative to position "3", the wheel stance has decreased by 3½ to about 4 inches and the wheel base has increased by 4 inches. The change in the distance "W3" and in the distance "L3" occurs simultaneously.

FIG. 12 shows wheel assemblies 24, 26 adjusted to the position "1" identified by indicator 126*d* (FIG. 6) in order for attachment 132 to be engaged with vehicle 10. In position "1", pin 114 is engaged in holes 86, 96 and front wheel assemblies 24, 26 are spaced a distance "L4" from rear wheels 16, 18. Front wheel assemblies 24, 26 are also spaced a distance "W4" from each other. Arm 104 is the 6-o'clock position in both front wheel assemblies 24, 26. In one aspect of the invention, the distance "W4" is about 31 inches and the distance "L4" is about 40 inches. Thus, relative to position "3" the wheel stance has decreased by about 8 inches and the wheel base has increased by about 3 inches. The change in the distance "W1" and in the distance "L1" occurs simultaneously. It should be noted that adjustment assembly 61 will be placed in position "1" when the lightest of the attachments is engaged with vehicle 10.

If it is needful for the operator to adjust the wheel assemblies 24, 26 back to position "4", then wheel/yoke 58/60 will be pivoted in the direction of arrow "G".

It should be noted that the purpose of enabling right and front wheel assemblies 24, 26 to be selectively adjustable is to change the lever or lever arm length of the forces between the weight of the attachment 14 engaged with vehicle 10 and the weight of the rest of vehicle 10 (including the weight of the operator) relative to each other and balanced about a pivot point, where the pivot point is the position of the locking member 114 on guide plate 62. The change in the relative position of locking member 114 from one position ("1" to "4") to changes the effective pivot point in accordance with the one of the attachments 14, 54, 128, 130, or 132 that is engaged with vehicle 10. The adjustment in the position of the pivot point effectively changes the balance between the weight of the overhung load relative to the rest of the vehicle's weight including the operator. This ensures that vehicle 10 functions in a stable fashion no matter what the weight of the attachment engaged with vehicle 10. It also ensures that the drive wheels 16, 18 have adequate traction with the ground 28 and that wheels 58, 64 remain free floating and zero turn while adequately supporting the weight balance between the front and back of vehicle 10.

Figure 6A:
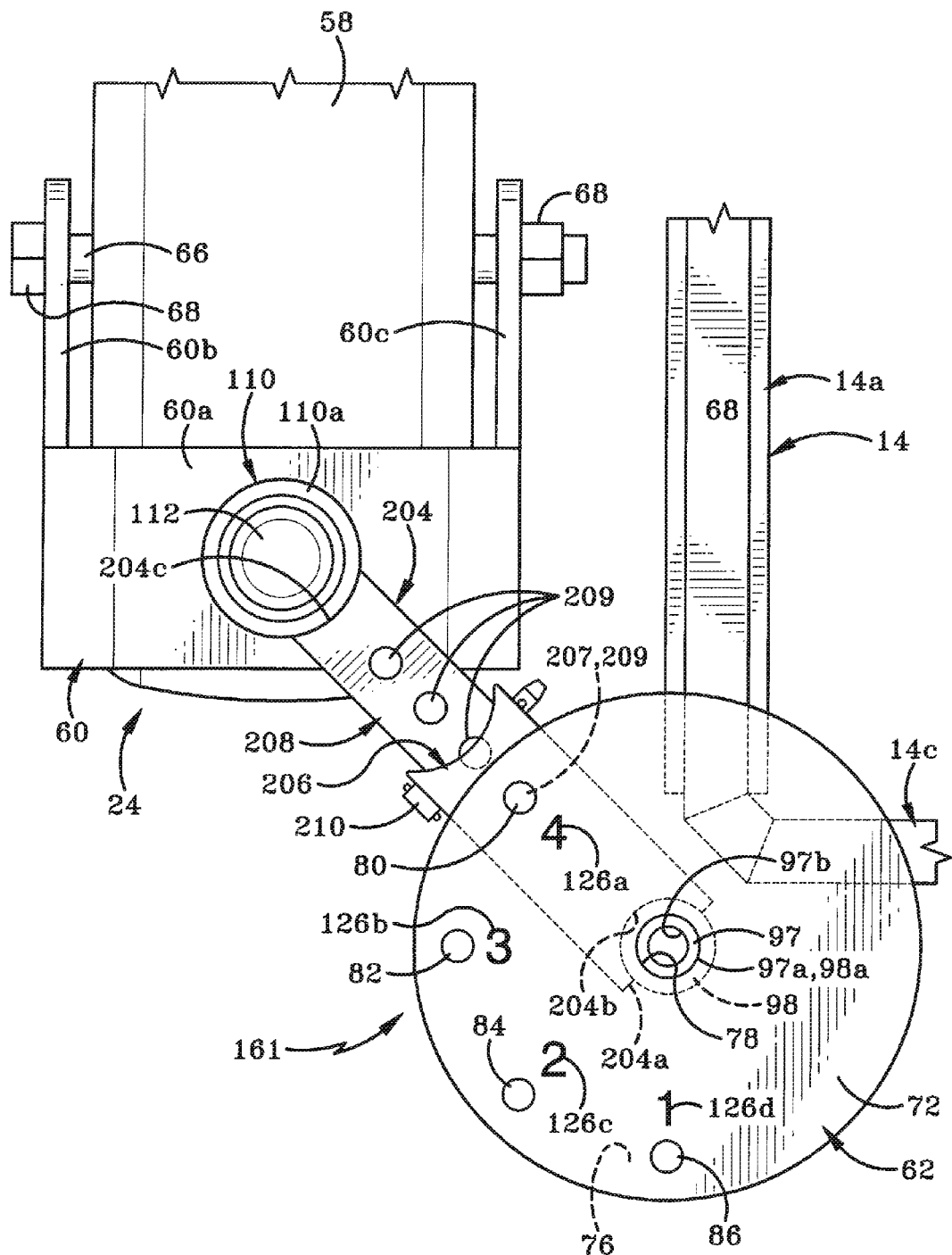
FIG. 6A is an enlarged top view of a second embodiment of the right front wheel assembly (with the pin removed for clarity) showing a telescoping arm connecting the yoke and the guide plate together.

FIG. 6A shows a second embodiment of the adjustment assembly, generally indicated at 161. All of the components of guide plate 62 are the same in adjustment assembly 161 but the configuration of the arm which secures guide plate 62 to yoke 60 is different. In particular, arm, represented by reference number 204, is a telescoping member which is adjustable in length to change the distance between guide plate 62 and wheel 58 and thereby further increase or decrease both the wheel base and wheel stance of vehicle 10. Arm 204 has a first end 204, with curved region 204*b* that is secured to bushing 98. The second end 204*c* of arm 204 is secured to sleeve 110.

Figure 8:
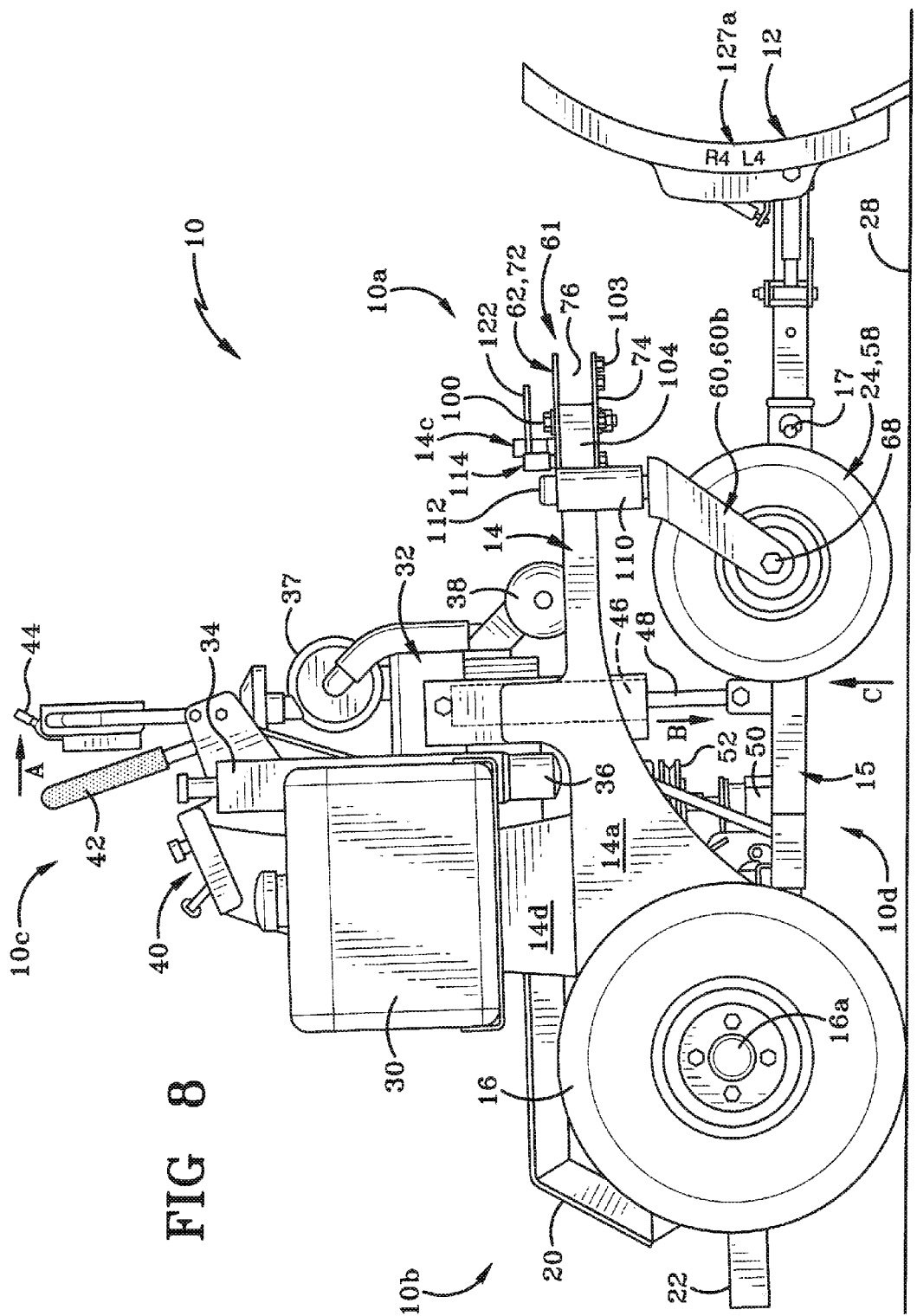
FIG. 8 is a right side view of the utility vehicle with the hydraulic system activated to position the vehicle for adjustment of the right and left wheel assemblies.

When the above-described adjustments have been made to wheel assemblies 24, 26 wheels 58, 64 need to be placed back into engagement with ground surface 28. To that end, the operator will move joystick 44 in the opposite direction to arrow "A" (FIG. 8). This actuates the hydraulic system and causes piston 48 to be withdrawn, at least partially, into cylinder 46 in the opposite direction of arrow "B". The pivotal motion of support bar 15 in response to withdrawal of the piston 48 connected thereto is that front wheel assemblies 24, 26 are lowered toward the ground surface 28 in the direction opposite to arrow "C'". This brings wheels 58 and 64 back into contact with ground surface 28. Once the wheel base and wheel stance have been adjusted in the manner described above, it is possible to remove snowplow blade 14 and replace it with another attachment, such as any of attachments 128, 130 or 132.

FIG. 13 shows an instance where a dissimilar adjustment is made to right front wheel assembly 24 from that made to left front wheel assembly 26. This situation arises when it is desired to engage a side-mounted attachment to utility vehicle 10. An example of this type of side-mounted attachment is edger 54. By way of example only, right front wheel assembly 24 is moved to position "4" in the manner described above, i.e., pin 114 is engaged in hole 80 on the associated guide plate 62. Left front wheel assembly 26 is moved to position "1" where the associated pin 114 is engaged in hole 86. Thus, right front wheel assembly 24 is spaced a distance "L1" from rear wheels 16, 18 and left front wheel assembly 26 is spaced a distance "L4" from rear wheels 16, 18. Right front wheel assembly 24 is thus closer to rear wheels 16, 18 than is left front wheel assembly 26. Additionally, right front wheel assembly 24 is positioned to rotate about an axis "F1" and left front wheel assembly is positioned to rotate about an axis "F2"—i.e., the two wheel assemblies are no longer laterally aligned with each other. The increased distance between left front wheel assembly 26 and rear wheel 18 allows for edger 54 to be engaged with utility vehicle 10 and be driven thereby by way of pulley 52 (FIGS. 1 and 13) and drive belt 56.

It will be understood that any desired configuration for right and left front wheel assemblies 24, 26 relative to rear wheels 16, 18 and each other may be utilized to set up vehicle 10 for engagement of any one of a variety of attachments.

In order to aid in reducing operator error in selecting the incorrect wheel base and wheel stance configuration for any one of the attachments 14, 54, 128, 130, and 132 each component is marked with an indicator 127a (FIG. 1), 127e (FIG. 13), 127b (FIG. 10), 127c (FIG. 11) or 127d (FIG. 12), respectively. Each indicator 127a-127e corresponds to the indicators 126a, 126b, 126c, or 126d on right and left front wheel assemblies. For example, in FIG. 1, snowplow blade 14 is marked with the indicator 127a which reads "R4 L4". This directs the operator to set right front wheel assembly 24 at position "4" and to set left front wheel assembly 26 at position "4". In FIG. 10 indicator 127b on attachment 128 reads "R3 L3". This indicator 127b tells the operator to set right front wheel assembly at position "3" and to set left front wheel assembly at position "3". In FIG. 13, indicator 127e on attachment 54 reads "R4 L1". This tells the operator to set right front wheel assembly at position "4" and to set left front wheel assembly at position "1". The operator thus simply matches indicator 127a-127e on the selected one of the attachments 14, 54, 128, 130, 132 and makes the appropriate changes to the right and left front wheel assemblies 24, 26.

Referring to FIG. 1, it should be noted that FIG. 1 includes the reference character "H". This denotes the operational height of portions of frame 14 which are aligned with bottom plate 74 of guide plate 62 on vehicle 10 relative to ground surface 28 prior to selective adjustment of the wheel base and/or wheel stance of vehicle 10. It should be noted that the operational height "H" of the frame 14 relative to ground surface 28 remains substantially the same prior to and after selective adjustment of one or both of the right and left front wheel assemblies 24, 26 to change the wheel base and/or wheel stance of the vehicle 10. The height "H" remains substantially constant no matter which position "1" through "4" the right and left front wheel assemblies 24, 26 are set at. So, for example, if right and left front wheel assemblies 24, 26 are each set at position "4" and are then adjusted to position "2", the height "H" relative to ground surface 28 at both positions is the same.

It will be understood that guide plate 62 may be provided with more than four aligned pairs of holes or fewer than four aligned pairs of holes so that more than four or less than four adjustment positions for wheel assemblies 24, 26 are provided.

Additionally, the method has been described as the operator utilizing the hydraulic system and the attachment that is engaged with utility vehicle 10 in order to lift wheels 58, 64 off the ground for adjustment of the right and left front wheel assemblies and again for lowering wheels 58, 64 to contact the ground surface 28. It will be understood that other methods of raising or lowering front end 10 of utility vehicle 10 or right and left wheel assemblies themselves may be used instead. For example, a small jack-type device could be integrally provided on vehicle 10, or separately provided therewith, and this jack could be used to lift wheels 58, 64 for adjustment and lower them again. Alternatively, some other separate support such as a block of wood for example, could be positioned in an appropriate location to slightly raise front wheels 58, 64 off the ground surface 28.

It will be understood that while the adjustment of the wheel base and the wheel stance of vehicle 10 has been described herein as a manual operation performed physically by the operator, vehicle 10 could be provided with appropriate electronic and mechanical components so that this adjustment operation could be an automated process. The operator would simply need to enter the appropriate commands on control panel 40. It should be noted that such an automated system could be configured to adjust the right and left wheel assemblies independently of each other or to adjust them at the same time if the adjustment mechanisms are linked to each other.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the aspects of the invention are an example and the invention is not limited to the exact details shown or described.

The invention claimed is:

1. A combination of an attachment and a utility vehicle, wherein the utility vehicle comprises:
   a frame having a front end and a rear end;
   a support member movably mounted on the frame;
   a locking mechanism adjacent the support member which detachably secures the attachment to the support member;
   a right and left rear wheel mounted proximate the rear end of the frame; and
   a right and left front wheel assembly mounted proximate the front end of the frame;
   said front wheel assemblies each including a front wheel;
   wherein the front wheels are spaced a first distance from each other and a second distance from the rear wheels;
   wherein when the attachment is secured to the support member, the support member and attachment are together movable downward relative to the frame to cause the front wheel assemblies to lift off the ground so that while the front wheel assemblies are lifted off the ground, one or both of the front wheel assemblies are selectively adjustable so as to vary one or both of the first distance and the second distance.

2. A system including:
   at least two attachments; each attachment being adapted to perform a different function, and wherein a first one of the attachments is of a different weight to a second one of the attachments; and
   a utility vehicle comprising:
   a frame having a front end and a rear end;
   a support member movably mounted on the frame;
   a locking mechanism adjacent the support member which alternately secures the first and second attachments directly to the support member;
   a left and a right rear wheel mounted proximate the rear end of the frame; and
   a left and a right front wheel assembly mounted proximate the front end of the frame;
   said front wheel assemblies each including a front wheel;
   wherein the front wheels are spaced a first distance from each other and a second distance from the rear wheels; and
   wherein the support member is movable downward relative to the frame while one of the attachments is in contact with the ground and secured directly to the support member by the locking mechanism to cause the front wheel assemblies to lift off the ground so that while the front wheel assemblies are lifted off the ground, one or both of the front wheel assemblies are selectively adjustable so as to vary one or both of the first distance and the second distance.

3. The combination of claim 1 wherein the support member is pivotally secured directly to the frame and pivotably movable downward relative to the frame to cause the front wheel assemblies to lift off the ground.

4. The combination of claim 1 wherein the support member and attachment together are movable downward to lift the front wheel assemblies off the ground while the attachment is in contact with the ground and secured to the support member by the locking mechanism.

5. The combination of claim 4 wherein the support member and attachment together are movable downward to lift the front wheel assemblies off the ground while the attachment is in contact with the ground forward of the front wheel assemblies.

6. The combination of claim 1 wherein the vehicle comprises a cylinder and piston operatively engaged with the support member so that extension of the piston causes movement of the support member.

7. The combination of claim 1 further comprising a pulley mounted on the frame; and a drive belt which engages the pulley to drive the attachment.

8. The combination of 1 wherein the attachment is one of a mower assembly, a mulcher, a snowplow blade, a snow blower, an edger assembly, a forklift assembly, a brushcutter, a roller assembly, an aerator and a vacuum assembly.

9. The system of claim 2 wherein the support member is pivotally secured directly to the frame and pivotably movable downward relative to the frame to cause the front wheel assemblies to lift off the ground.

10. The system of claim 2 wherein the support member and attachment together are movable downward to lift the front wheel assemblies off the ground while the one of the attachments secured to the support member is in contact with the ground forward of the front wheel assemblies.

11. The system of claim 2 wherein the vehicle comprises a cylinder and piston operatively engaged with the support member so that extension of the piston causes movement of the support member.

12. The system of claim 2 further comprising a pulley mounted on the frame; and a drive belt which engages the pulley to drive the attachment.

13. The system of claim 2 wherein the one of the attachments which is in contact with the ground and secured directly to the support member by the locking mechanism to cause the front wheel assemblies to lift off the ground is one of a mower assembly, a mulcher, a snowplow blade, a snow blower, an edger assembly, a forklift assembly, a brushcutter, a roller assembly, an aerator and a vacuum assembly.

14. A method comprising the steps of:
providing a utility vehicle which includes a frame, a support member mounted on the frame, a pair of laterally spaced apart first wheel assemblies and a pair of laterally spaced apart second wheels, where the second wheels are spaced longitudinally from the first wheel assemblies;
providing an attachment which is detachably engageable with the support member and securable to the support member by a locking mechanism;
while the attachment is secured to the support member by the locking mechanism, moving the support member and attachment together downward relative to the frame to cause the first wheel assemblies to lift off the ground; and
while the first wheel assemblies are lifted off the ground, adjusting at least one of the first wheel assemblies so that the at least one of the first wheel assemblies moves at least one of laterally and longitudinally relative to the second wheels.

15. The method of claim 14 wherein the support member is pivotally secured directly to the frame; and the step of moving comprises pivoting the support member downward relative to the frame to cause the first wheel assemblies to lift off the ground.

16. The method of claim 14 wherein the step of moving the support member occurs while the attachment is in contact with the ground and secured to the support member by the locking mechanism.

17. The method of claim 16 wherein the first wheel assemblies are front wheel assemblies; and the attachment is in contact with the ground forward of the front wheel assemblies during the step of moving the support member.

18. The method of claim 14 wherein the vehicle comprises a cylinder and piston operatively engaged with the support member; and the step of moving the support member is effected by activating the cylinder and piston to cause movement of the piston.

19. The method of claim 14 further comprising the step of driving the attachment with a drive belt which engages a pulley mounted on the frame.

20. The method of claim 14 wherein the attachment is one of a mower assembly, a mulcher, a snowplow blade, a snow blower, an edger assembly, a forklift assembly, a brushcutter, a roller assembly, an aerator and a vacuum assembly.

21. The combination of claim 1 wherein the attachment comprises a shaft which extends within a bore of the support member when the locking mechanism secures the attachment to the support member.

22. The combination of claim 21 wherein the locking mechanism is a locking pin which is selectively inserted through a pair of aligned holes respectively formed in the shaft and support member.

23. The combination of claim 1 wherein the locking mechanism is a locking pin which is selectively inserted through a pair of aligned holes respectively formed in the attachment and support member.

24. The system of claim 2 wherein when the attachment is secured to the support member, the support member and attachment are together movable downward relative to the frame to cause the front wheel assemblies to lift off the ground.

25. The system of claim 2 wherein the attachment comprises a shaft which extends within a bore of the support member when the locking mechanism secures the attachment to the support member.

26. The system of claim 25 wherein the locking mechanism is a locking pin which is selectively inserted through a pair of aligned holes respectively formed in the shaft and support member.

27. The system of claim 2 wherein the locking mechanism is a locking pin which is selectively inserted through a pair of aligned holes respectively formed in the attachment and support member.

28. The method of claim 14 wherein the locking mechanism is a locking pin; and further comprising the step of securing the attachment to the support member by inserting the locking pin through a pair of aligned holes respectively formed in the attachment and support member.

29. The method of claim 14 further comprising the step of securing the attachment to the support member with the locking mechanism so that a shaft of the attachment extends within a bore of the support member.

30. The method of claim 29 wherein the locking mechanism is a locking pin; and wherein the step of securing the attachment to the support member comprises inserting the locking pin through a pair of aligned holes respectively formed in the shaft and support member.

* * * * *